W. G. HUYETT.
Grinding Mill.
No. 18,905.
Patented Dec. 22, 1857.
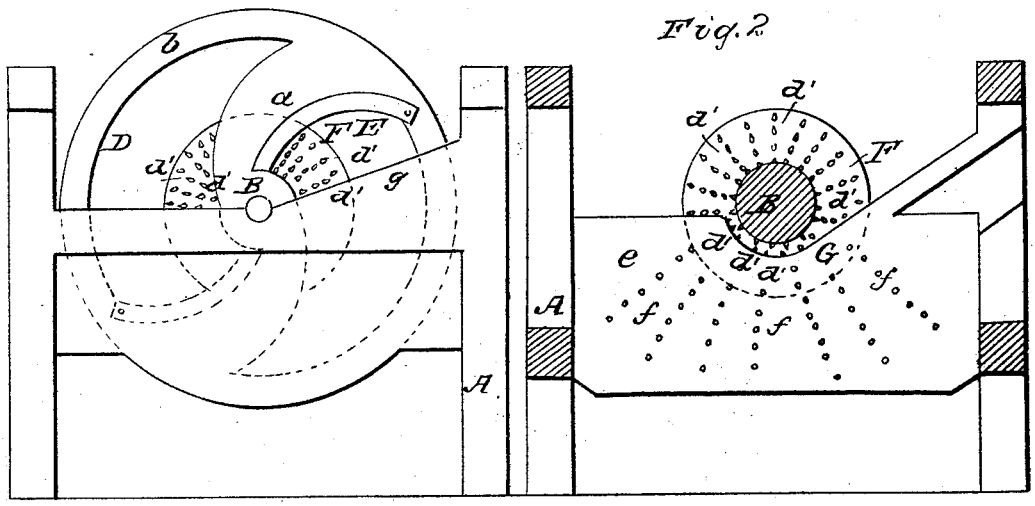

UNITED STATES PATENT OFFICE.

WM. G. HUYETT, OF WILLIAMSBURG, PENNSYLVANIA.

MACHINE FOR CUTTING AND GRINDING CORNSTALKS.

Specification of Letters Patent No. 18,905, dated December 22, 1857.

*To all whom it may concern:*

Be it known that I, WILLIAM G. HUYETT, of Williamsburg, in the county of Blair and State of Pennsylvania, have invented a new and Improved Machine for Cutting and Grinding Cornstalks; and I do hereby declare that the following is a full, clear, and exact description of the same, reference being had to the annexed drawings, making a part of this specification, in which—

Figure 1, is a side view of my improvement. Fig. 2, is a vertical section of ditto, *x, x*, Fig. 3, showing the plane of section. Fig. 3, is a plan or top view of ditto.

Similar letters of reference indicate corresponding parts in the several figures.

This invention consists in combining a conical grinding shell with a vertical grinding disk and vertical cutting knives, in such a manner that the bottom part of the shell shall form an incline down which the cut stalks shall roll and thus prevent the grinding disk from being choked up, and also prevent the cutting knives from becoming choked; the stalks which roll down the inclined or conical shell being also ground during their downward passage.

To enable those skilled in the art to fully understand and construct my invention, I will proceed to describe it.

A represents a rectangular frame in which a shaft B, is placed, said shaft having a driving pulley C, on one end, and a wheel D, on the opposite end. The wheel D, has two curved arms *a, a*, which have knives E, on their concave sides, the curve of the knives corresponding with that of the arms, as plainly shown in Fig. 1. The inner sides of the arms and also the inner side of the rim *b*, of the wheel D, are provided with teeth or studs *c*.

F, represents a cone which is placed upon the shaft B, the small end of the cone being in contact with the center of the wheel D, as shown in Fig. 3.

G, is a concave placed underneath the cone F. This concave is provided with teeth *d*, and the cone F, is also provided with teeth *d′*.

The lower half of the wheel D, works between two plates, the inner one, *e*, of which is provided with teeth *f*, as shown clearly in Fig. 2.

The stalks are fed through the wheel D, and rest upon an inclined plane *g*, on the frame, said inclined plane having a metallic plate *h*, upon it, over the edge of which the knives E, E, pass, as the wheel D, is rotated. The stalks are cut by the knives E, upon the edge of the plate *h*, and are ground between the cone F and concave G; the portion that passes down between the plates *e*, is not allowed to pass out in an unground state, but is ground between the inner side of the rim of the wheel D, and the toothed side of the inner plate *e*.

By the above improvement, the stalks are cut and ground as near the shaft B, as possible, and consequently the machine may be operated with but a small expenditure of power.

I am aware that cutting wheels furnished with curved knives, and with grinding teeth, working in conjunction with toothed disks, as in my improvement, whereby the stalks as soon as they are cut by the knives will pass into the toothed disk and thereby be ground, are old; and therefore I do not claim vertical cutting wheels and toothed disks.

I am also aware that toothed grinding cylinders and also toothed grinding cones, with toothed grinding beds or shells of corresponding form, have been and are now in very common use for grinding purposes and therefore I distinctly disclaim them.

I am also aware that grinding cylinders and cones have been combined with vertical cutting wheels having grinding teeth and curved knives, the grinding teeth working in connection with a toothed disk: but I am not aware that the small end of a conical grinding shell has ever been combined with such a cutting wheel and vertical disk, as above mentioned, in such a manner as that the said grinding shell shall form an inclined plane down which a portion of the stalks shall fall, as fast as cut by the knives, and thus prevent the knives and also the vertical grinding disk from being choked; the said stalks which fall down the incline being ground during their descent by a conical toothed cylinder working within said conical shell.

Practical experiment proves that when the before described cutting knives and toothed disk are used for cutting and grinding the stalks; or when a cylinder with teeth for grinding is combined, at right angles to said knives and disk; or when a toothed grinding cone is combined therewith at right angles, its largest end being next to the knives and toothed disk, that all of such devices soon choke up in consequence of the crowding together of the stalks at the point where they leave the knives, or rather at or near the cutting edge. If the stalks are a little damp this difficulty is greatly increased. But by combining an inclined grinding surface with the knives and disk aforesaid, that portion of the cut stalks which would otherwise have been detained near the knives will fall down the said inclined grinding surface of their own gravity, and prevent any choking. The machine thus becomes a self clearing apparatus. Besides this the stalks are distributed over a large grinding surface very evenly, and thus a better grinding of them is obtained at a less expenditure of power than can be realized in any other manner.

It is obvious that the combination here described presents important results and to the best of my belief those results and the combination I have described are new. Therefore—

What I claim as new in corn-stalk grinders and desire to secure by Letters Patent is,

Combining an inclined grinding concave G, with a cutting wheel D, and disk *e*, in the manner and for the purposes substantially as herein described.

WILLIAM G. HUYETT.

Witnesses:
 ISAAC YINGLING,
 JACOB YINGLING.